United States Patent
Li et al.

(10) Patent No.: US 11,142,460 B2
(45) Date of Patent: Oct. 12, 2021

(54) GRAPHENE POWDER AND METHOD FOR REPAIRING DEFECT OF GRAPHENE

(71) Applicant: XSENSE TECHNOLOGY CORPORATION, Tortola (VG)

(72) Inventors: Zhen-Yu Li, Miaoli County (TW); Po-Min Tu, Miaoli County (TW); Chia-Jung Chen, Miaoli County (TW); Yeu-Wen Huang, Miaoli County (TW)

(73) Assignee: XSENSE TECHNOLOGY CORPORATION, Tortola (VG)

( * ) Notice: Subject to any disclaimer, the term of this patent is extended or adjusted under 35 U.S.C. 154(b) by 331 days.

(21) Appl. No.: 16/412,582

(22) Filed: May 15, 2019

(65) Prior Publication Data

US 2019/0352187 A1 Nov. 21, 2019

(30) Foreign Application Priority Data

May 16, 2018 (TW) .................. 107116597

(51) Int. Cl.
*C01B 32/194* (2017.01)
*B82Y 30/00* (2011.01)
*B82Y 40/00* (2011.01)

(52) U.S. Cl.
CPC ............. *C01B 32/194* (2017.08); *B82Y 30/00* (2013.01); *B82Y 40/00* (2013.01);
(Continued)

(58) Field of Classification Search
CPC .............. C01B 32/194; C01B 2204/22; C01B 2204/24; C01B 2204/20; C01B 32/19;
(Continued)

(56) References Cited

U.S. PATENT DOCUMENTS

2016/0176714 A1\* 6/2016 Do ............................. B01J 8/02
423/448
2016/0272583 A1\* 9/2016 Lee ....................... C01B 32/192

OTHER PUBLICATIONS

Qian, et al., Facile Preparation of Nitrogen-Doped Few-Layer Graphene via Supercritical Reaction, ACS Appl. Mater. Interfaces 2011; 3: 2259-2264 (Year: 2011).\*

(Continued)

*Primary Examiner* — Daniel C. McCracken
(74) *Attorney, Agent, or Firm* — Amin, Turocy & Watson, LLP (57) ABSTRACT

The present disclosure provides a method for repairing defect of graphene, including: firstly introducing a composite fluid containing a reactive compound and a supercritical fluid to a reactor where the graphene powder has been placed, and impregnating the graphene powder with the composite fluid to passivate and repair the defect of graphene, wherein the reactive compound includes carbon, hydrogen, nitrogen, silicon or oxygen element; and separating the composite fluid from the graphene powder, simultaneously using molecular sieves to absorb the graphene from the composite fluid. The present disclosure further provides the graphene powder prepared by the method above. With the method of the present disclosure, it effectively reduces the ratio of the defect of the graphene, increases the content of the graphene, and has less-layer graphene with high thermal conductivity and electrical conductivity.

18 Claims, 9 Drawing Sheets

(52) U.S. Cl.
CPC ...... *C01B 2204/22* (2013.01); *C01B 2204/24* (2013.01); *C01P 2002/82* (2013.01); *C01P 2006/32* (2013.01); *C01P 2006/40* (2013.01)

(58) Field of Classification Search
CPC ... C01B 32/196; C01B 32/182; C01B 32/198; C01B 2204/00; C01B 2204/02; C01B 2204/04; C01B 2204/06; C01B 2204/065; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; B82Y 30/00; B82Y 40/00; C01P 2002/82; C01P 2006/32; C01P 2006/40; Y02P 20/54

See application file for complete search history.

(56) References Cited

OTHER PUBLICATIONS

Sasikala, et al., Simultaneous Graphite Exfoliation and N Doping in Supercritical Ammonia, ACS Appl. Mater. Interfaces 2016; 8: 30964-30971 (Year: 2016).*

Zhou, et al., One-pot synthesis of B-doped three-dimensional reduced graphene oxide via supercritical fluid for oxygen reduction reaction, Green Chem 2015; 17: 3552-3560 (Year: 2015).*

* cited by examiner

GRAPHENE POWDER AND METHOD FOR REPAIRING DEFECT OF GRAPHENE

BACKGROUND

1. Technical Field

The present disclosure relates to a method for repairing defects of graphene, and more particularly to a method for repairing defects of graphene by using a composite fluid having a reactive compound and a supercritical fluid.

2. Description of the Prior Art

Graphene is a two-dimensional honeycomb-like carbonaceous material composed of a single layer of carbon atoms. It is one of the thinnest and strongest nanomaterials. The graphene has excellent electrical conductivity, thermal conductivity, mechanical and barrier properties, thermal stability, light transmittance and corrosion resistance, so it can be applied to various fields as the functional filler in, for example, electronic components, light-emitting components, electromagnetic shielding, lithium battery electrodes, solar cells, conductive coatings, heat-dissipating materials, conductive inks and biological sensors.

At present, the main methods for preparing graphene include: physical delamination, redox, frying, acetylene combustion, but the above methods all easily lead the graphene to produce many defects, which are caused by covalent bond cleavage at grain boundaries to form dangling bonds. If such defects are not repaired, they would affect the electrical properties, physical properties and chemical properties of graphene, and further limits its application fields. Therefore, repairing the graphene defect is an urgent problem to be solved in this technical field.

However, the prior art mainly uses a wet chemical reaction method by bonding an element such as hydrogen or oxygen to repair the graphene defect, but the wet chemical reaction is carried out at room temperature, limiting the effect of passivating defects, so that the characteristics of the graphene are not completely repaired. Furthermore, the elements of the wet chemical reaction process are difficult to penetrate into the multilayer graphene layers and the interior thereof, and the graphene layers of the double layers or more cannot be completely repaired; and steps of the wet chemical reaction process are complicated and costly, and the waste liquid formed by the process is a hidden concern for the future environment, and it has become one of the obstacles for quantifying the production of graphene.

In view of the above, it is necessary to propose a method for repairing defects of graphene which can effectively reduce the defects of graphene, improve graphene performance, and is low-cost, so as to solve the problems of the prior art.

SUMMARY

In order to solve the above problems, the present disclosure provides a method for repairing defects of graphene, comprising steps of: introducing and subjecting a composite fluid having a reactive compound and a supercritical fluid to impregnate a graphene powder therewith in a reactor containing the graphene powder and conforming to a supercritical fluid environment, wherein the reactive compound is a compound comprising an element of carbon, hydrogen, nitrogen, silicon or oxygen to passivate and repair the defects of the graphene powder; and separating the composite fluid and the graphene powder, and adsorbing the graphene powder retained in the composite fluid by a molecular sieve.

The present disclosure further provides a graphene having at least one chemical bond selected from the group consisting of N—H, C—H, C—O, C—N, and C—Si, and a number of layers of the graphene is 20 or less, wherein the graphene powder has a 2D/G value of 0.3 to 0.6, and the graphene powder has a G/D value of 2.0 to 4.0, and wherein the 2D/G value and the G/D value are obtained from an intensity ratio of a Raman shift 1351 wavenumber (D band), a Raman shift 1587 wavenumber (G band), and a Raman shift 2687 wavenumber (2D band) analyzed by a Raman spectroscopy.

Based on the method for repairing defects of graphene of the present disclosure, the ratio of defects of graphene can be effectively reduced, and the composition content of graphene can be effectively increased. Also, the number of layers of graphene can be effectively reduced. In addition, the graphene powder with good thermal conductivity and electrical conductivity can be provided. Therefore, the present disclosure can provide a simple process and low process cost without any pollution problem, and have wide application prospects.

BRIEF DESCRIPTION OF THE DRAWINGS

Embodiments of the present disclosure are illustrated by way of examples with reference to the accompanying figures.

DETAILED DESCRIPTION OF THE EMBODIMENTS

Examples of the present disclosure are described by the embodiments, and those skilled in the art can readily understand the advantages and functions of the present disclosure. The present disclosure may be implemented or carried out by other methods, and various modifications and changes can be made in the various details of the present disclosure, without departing from the spirit and scope of the present disclosure. Moreover, all ranges and values herein are inclusive and combinable. Any value or point falling within the ranges described herein, such as any integer, may be the minimum or maximum value that derives the lower range, and the like.

According to the present disclosure, a method for repairing defects of graphene comprises steps of: introducing and letting a composite fluid having a reactive compound and a supercritical fluid impregnate a graphene powder therewith in a reactor containing the graphene powder and conforming to a supercritical fluid environment, wherein the reactive compound is a compound comprising an element of carbon, hydrogen, nitrogen, silicon or oxygen to passivate and repair the defects of the graphene powder; and separating the composite fluid and the graphene powder, and adsorbing the graphene powder retained in the composite fluid by molecular sieves.

The graphene powder, without any repair treatment, is a graphene having 30 or less layers, in particular, 20 or less layers, or 10 or less layers of graphene.

The present disclosure utilizes the solubility and diffusion capacity of the supercritical fluid to make the supercritical fluid as a carrier or solvent of the reactive compound, and when the supercritical fluid penetrates into the layered structure of the graphene, the reactive compound simultaneously passivate and repair the position of grapheme defects. After the repair is completed, the solvent thereof can be completely separated. Since the solvent is a supercritical fluid, which is a dry repair process, it solves the problem that the solvent retains on the graphene and affects performance. In addition, by the penetration of the supercritical fluid, the interlayer force between layers of the graphene can be effectively reduced. The graphene can be further delaminated to reduce a number of layers of the graphene, and the yield of graphene can be increased, and thus improve the performance of graphene powder. Among them, the supercritical fluid includes carbon dioxide, nitrogen, ethylene, propane, propylene or water. In an embodiment, the supercritical fluid is carbon dioxide or water.

The reactive compound is a compound including an element of carbon, hydrogen, nitrogen, silicon or oxygen, and the reactive compound can convert into an ionic state in the supercritical fluid environment, so as to react with dangling bonds in the graphene layers structure to form bonding having elements such as carbon, hydrogen, nitrogen, silicon or oxygen. It has purpose of passivating and modifying the surface functional groups of graphene to improve the processability of the back end application. The reactive compound selected as the solute may be in any form including a solid state, a liquid state or a gaseous state, wherein the reactive compound is particularly preferably in a gaseous state, and a substance which does not react with the supercritical fluid and a compound which has good solubility with the supercritical fluid is considered. In order to reduce the reaction energy barrier of the reactive compound, the molecular weight of the reactive compound is preferably not more than 200 g/mol, and the adsorption between the reactive compound and the graphene dangling bond is also particularly important. In one embodiment, the reactive compound comprises at least one selected from the group consisting of an organic silicon compound, an alkane, an alkene, an alkyne, an ammonia molecule and a derivative thereof, a hydroxide, and an organic base.

In another embodiment, when the supercritical fluid is carbon dioxide, the reactive compound comprises one selected from the group consisting of a silane compound, ethylene, methane, acetylene, ammonia, and water, wherein the silane compound comprises silicane, methylsilane or dimethylsilane.

In yet another embodiment, when the supercritical fluid is carbon dioxide, the reactive compound is water, ammonia or a silane compound.

The method for repairing defects of graphene of the present disclosure further comprises steps of: prior to the introduction of the composite fluid having the reactive compound and the supercritical fluid, letting the fluid in the mixing tank to a preset temperature and pressure value in a supercritical state with a high pressure injection pump and a heater; then, injecting the reactive compound into the mixing tank for 5 to 10 minutes to dissolve the reactive compound in the supercritical fluid to form a composite fluid having the reactive compound and the supercritical fluid.

In one embodiment, the volume ratio of the reactive compound to the supercritical fluid is from 1:1 to 1:10.

In another embodiment, the volume ratio of the reactive compound to the supercritical fluid is from 1:1 to 1:2.

Figure 1:
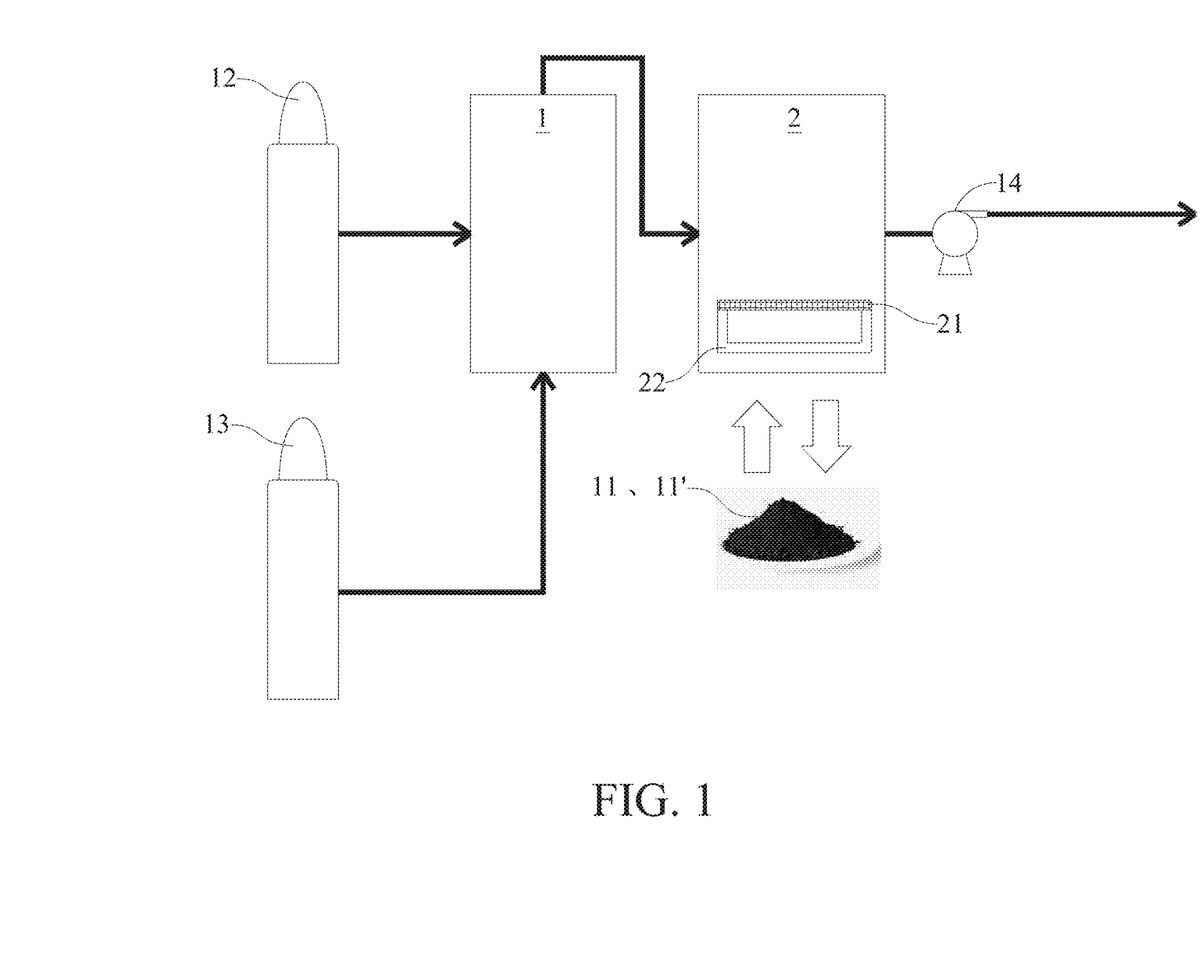
FIG. 1 is a flow chart of a first embodiment of a graphene defect repairing processing apparatus.

FIG. 1 shows a graphene defect improving treatment apparatus of the present disclosure, and the apparatus includes a supercritical fluid storage tank 12, a reactive compound storage tank 13, a mixing tank 1, a reactor 2, and a pump 14, respectively. The reactor 2 includes a container 22 and molecular sieves 21, and the molecular sieves 21 can be formed to a layer. The operation process includes: placing the graphene powder 11 in the container 22 of high pressure resistant reactor 2; introducing a composite fluid, which is composed of a reactive compound and a supercritical fluid, sufficiently dissolving in the mixing tank 1, after the reactor reaches a preset temperature and pressure value and conforms to the supercritical fluid environment; high pressure impregnating the graphene powder in the reactor 2 for a preset time to passivate and repair the defects of the graphene; finally, after completely separating the repaired graphene powder and the composite fluid with the pump 14, returning the reactor to normal temperature and pressure, and retrieving the repaired graphene powder 11'. The molecular sieves 21 can adsorb the graphene powder retained in the composite fluid in the separation process. The graphene powder retained on the molecular sieves can also be used as a back end application.

Figure 2:
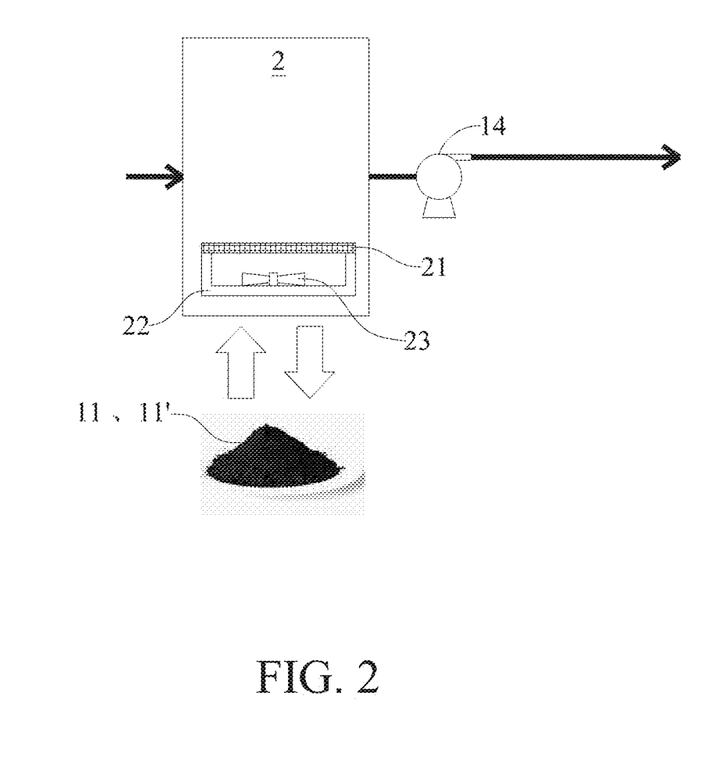
FIG. 2 is a schematic view of apparatus of a reactor.

In an embodiment, with reference to FIG. 2, the reactor 2 is further provided with a stirring device 23 for mechanically or magnetically controlling the graphene powder 11 in the container 22, so as to improve the impregnation efficiency of the composite fluid having the reactive compound and the supercritical fluid in the graphene powder.

In another embodiment, the graphene powder is directly placed in a reactor in which no container is disposed.

In one embodiment, the pressure of the reactor is from 50 to 100 standard atmospheric pressure, and the temperature of the reactor is from 25 to 400° C.

In another embodiment, when the supercritical fluid is carbon dioxide, the pressure of the reactor is 62 to 82 standard atmospheric pressures, and the temperature of the reactor is 28 to 40° C.

In one embodiment, the impregnation time is from 2 to 60 minutes.

In another embodiment, the impregnation time is from 10 to 30 minutes.

In one embodiment, the volume ratio of the graphene powder to the composite fluid in the reactor is from 0.01 to 1000.

On the other hand, since the supercritical fluid has the effect of extracting impurities such as sulfides, phosphides, iron-containing substances and the like in the graphene, after the impregnation treatment it requires complete separation of the composite fluid having the reactive compound and supercritical fluid to prevent the impurities retaining on the surface of the graphene, affecting the efficacy of the product.

The pore size of the molecular sieve is mainly less than 50 micrometers, and the molecular sieve pore size is selected according to the back end application of the graphene: if the back end application is in the heat dissipation field, the molecular sieves is selected to have a pore size of 30 to 50 micrometers; while in the field of batteries, the molecular sieves are selected to have a pore size of less than 5 microns.

In one embodiment, the step of separating the composite fluid and the graphene powder comprises feeding the composite fluid into a separation tank independent of the reactor.

Moreover, in an embodiment, the method for improving the graphene defect further comprises a step of preparing a graphite material into a graphene powder prior to or simultaneously with the introduction of the composite fluid.

Figure 3:
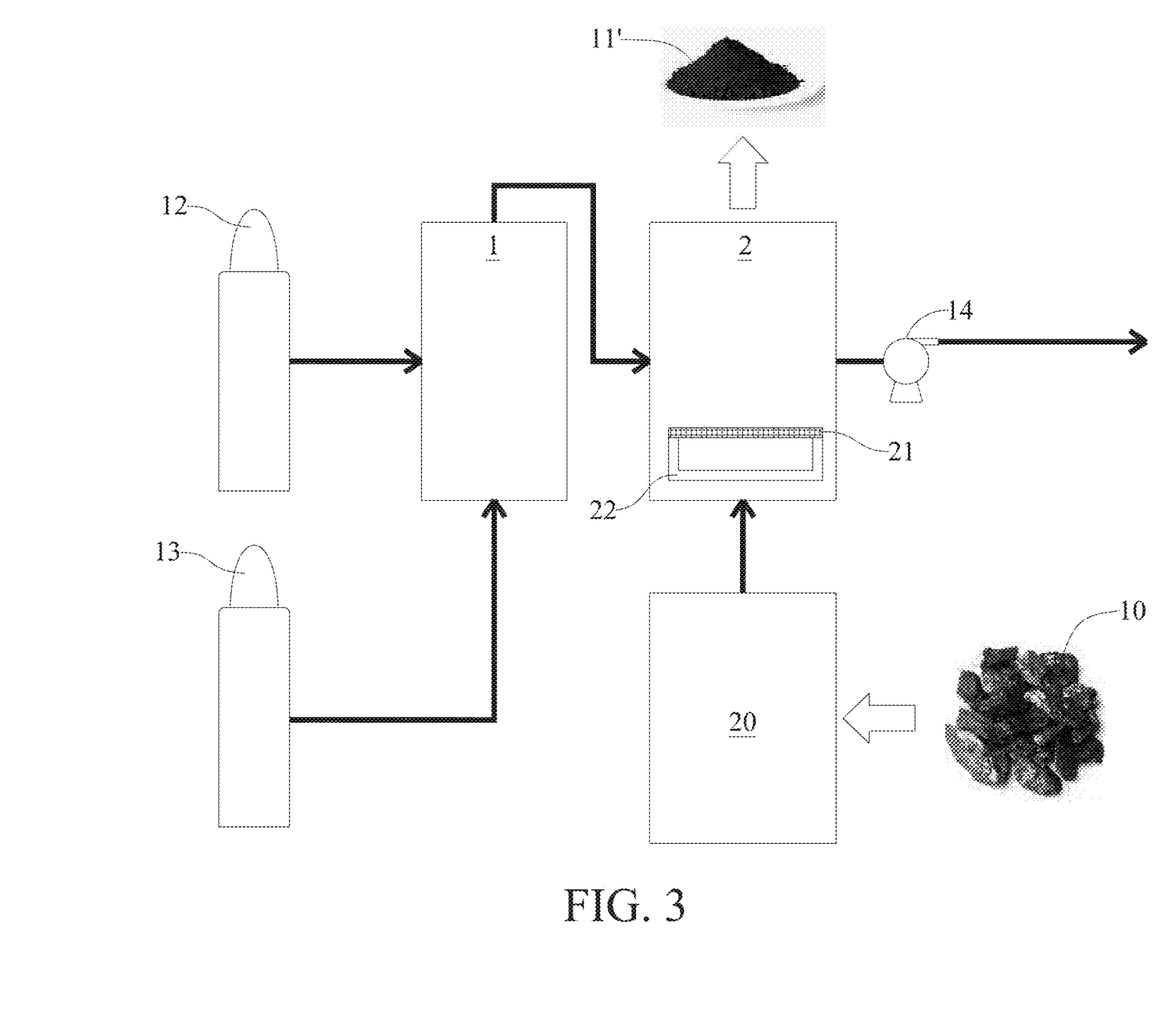
FIG. 3 is a flow chart showing a second embodiment of the graphene defect repairing processing apparatus.

With reference to FIG. 3, an embodiment of a method for repairing graphene defects is carried out by preparing a graphite material into a graphene powder in a preparation tank 20 independent of the reactor prior to the introduction of the composite fluid into the reactor 2. The method for preparing graphene powder includes physical delamination, redox, frying or acetylene combustion; after being prepared, the graphene powder is transferred to a container 22 in the reactor 2 for high pressure impregnation treatment. The operation process comprises steps of: after preparing the graphite material 10 into the graphene powder in the preparation tank 20, transferring the graphene powder to the container 22 of the reactor 2; when the reactor 2 reaches a preset temperature and pressure value, introducing a composite fluid, which is composed of a reactive compound and a supercritical fluid, sufficiently dissolving in the mixing tank 1; high pressure impregnating the graphene powder in the reactor 2 for a preset time to passivate and repair the defects of the graphene; finally, completely separating the composite fluid and the repaired graphene powder with the pump 14, then returning the reactor to normal temperature and normal pressure, and retrieving the repaired graphene powder 11'. The molecular sieves 21 can adsorb the graphene powder retaining in the composite fluid in the separation process, and the graphene powder retained on the molecular sieves can also be used as a back end application.

In one embodiment, the graphite material is selected to have a particle size of less than 10 microns and a graphene content of greater than 95%.

In another embodiment, the method for repairing defects of graphene is to form a graphite material into graphene powder in the reactor when the composite fluid is introduced.

Figure 4:
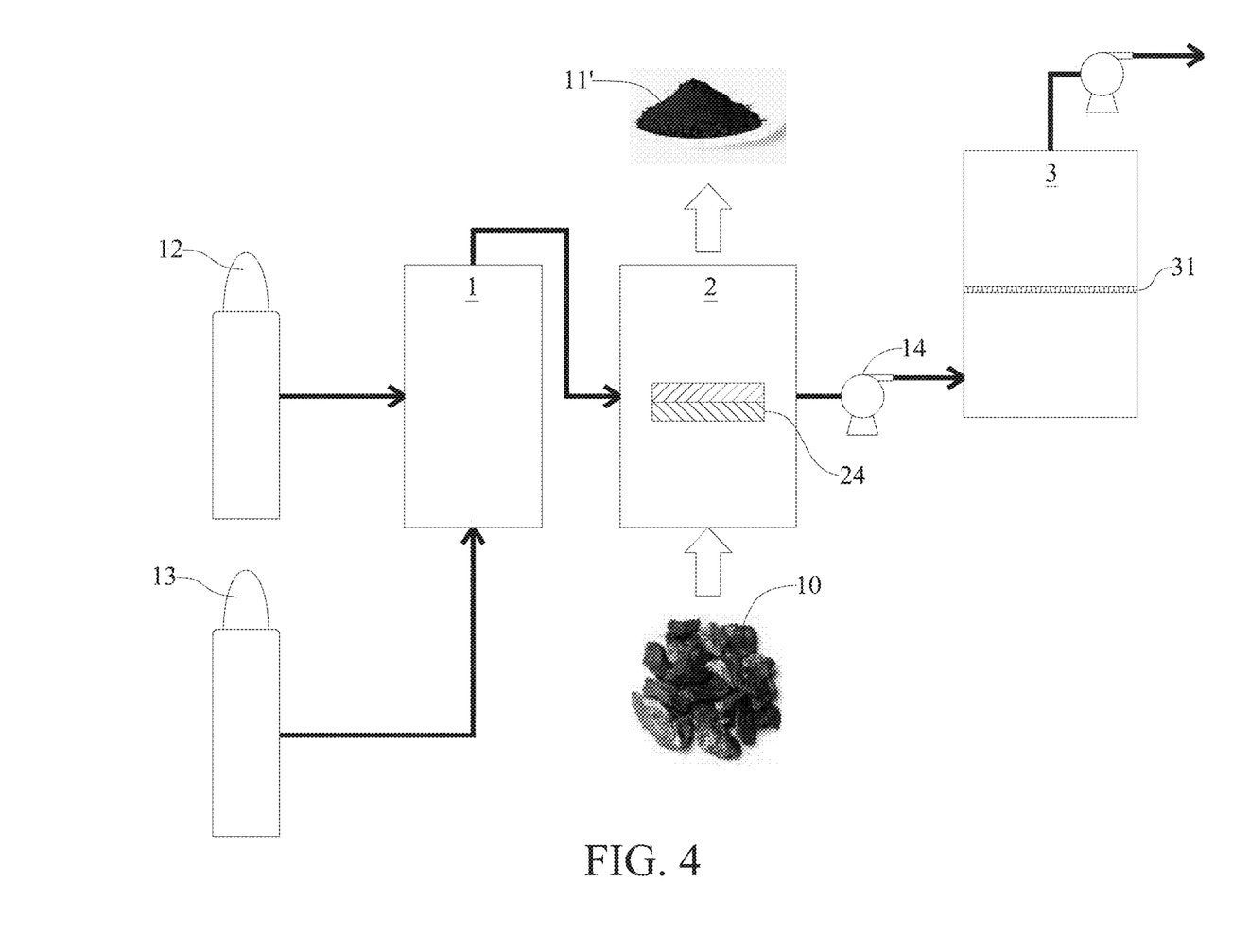
FIG. 4 is a flow chart showing a third embodiment of the graphene defect repairing processing apparatus.

With reference to FIG. 4, an embodiment of preparing a graphene powder simultaneously with the introduction of the composite fluid, wherein the reactor 2 is further provided with a grinding device 24 for preparing the graphene powder from the graphite material 10 by physical delamination. The graphene powder is simultaneously impregnated with a composite fluid having a reactive compound and a supercritical fluid at a preset temperature and pressure value in accordance with a supercritical fluid environment for a preset time to have effects of passivating and repairing its defects; after impregnating the graphene powder, stand still for at least 30 minutes to settle the repaired graphene powder in the grinding device 24; then, after completely separating the composite fluid and the repaired graphene powder, returning the tank to normal temperature and pressure, and retrieving the repaired graphene powder 11', wherein the separation process further includes a step of introducing the composite fluid separated from the reactor into a separation tank 3 with the pump 14, and the temperature and pressure of the separation tank 3 are also in a supercritical fluid environment to maintain the solvent in a supercritical state; molecular sieves 31 is disposed in the separation tank 3, and the molecular sieves 21 can adsorb the graphene powder retained in the composite fluid, and the graphene powder retained on the molecular sieve powder may be used as a back end application.

Figure 5:
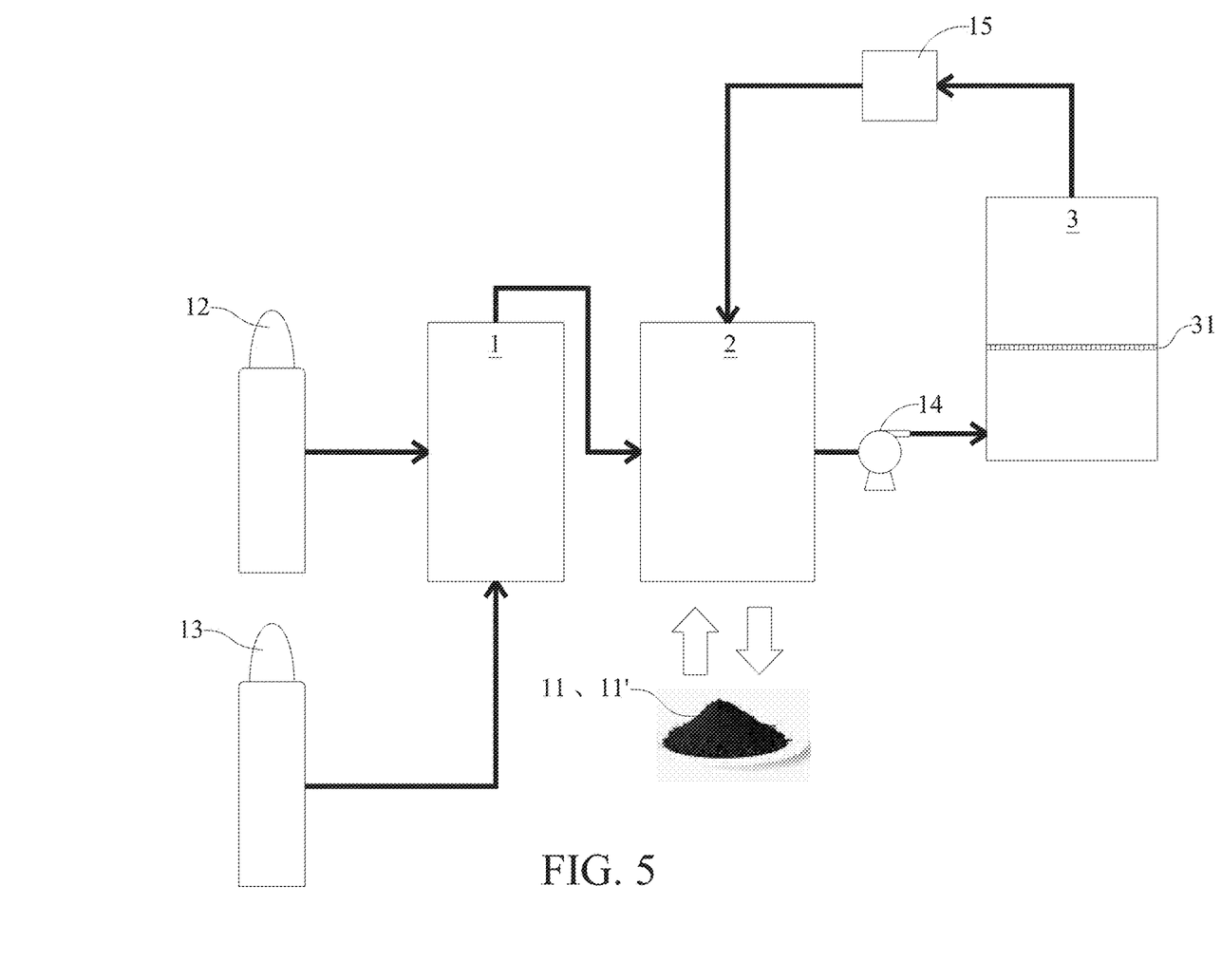
FIG. 5 is a flow chart showing a fourth embodiment of the graphene defect repairing processing apparatus.

With reference to FIG. 5, in an embodiment, the method for repairing defects of graphene of the present disclosure further comprises a step of after separating the composite fluid and the graphene powder, filtering the composite fluid having the reactive compound and the supercritical fluid through the filtration device 15, and refluxing the composite fluid into the reactor 2 to recycle.

In another embodiment, in the reactor, the proportion of the refluxed composite fluid having the reactive compound and the supercritical fluid is 5 to 20%.

Figure 6:
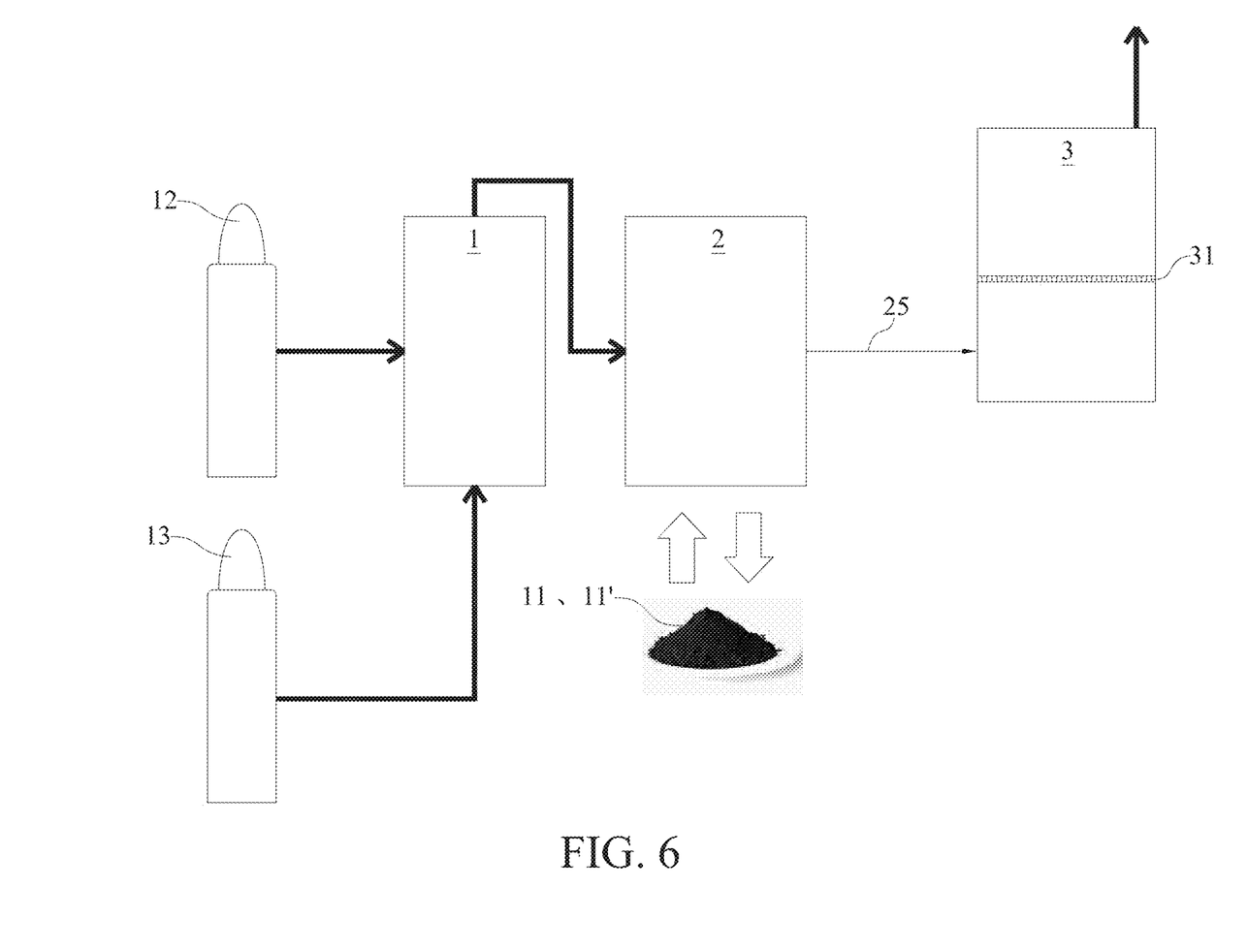
FIG. 6 is a flow chart showing a fifth embodiment of the graphene defect repairing processing apparatus.

With reference to FIG. 6, in an embodiment, the method for repairing defects of graphene of the present disclosure further comprises a step of connecting the reactor 2 and the separation tank 3 with a pipeline 25 having a diameter of less than 1 mm, and a composite fluid flow rate of the pipeline 25 is at least 400 m/s, which is different from the general connecting line with a diameter of at least 2 to 3 cm. The pressure difference between the reactor and the separation tank, and the impact force of the composite fluid in the narrow tube wall are used to prepare the repaired graphene powder 11' having a diameter of less than 10 nm, or even the graphene powder having a particle diameter of less than 5 nm. It is a graphene quantum dot with a quantum confinement effect and a boundary effect, being used in solar photovoltaic devices, biomedicine, light-emitting diodes and sensors.

Figure 7:
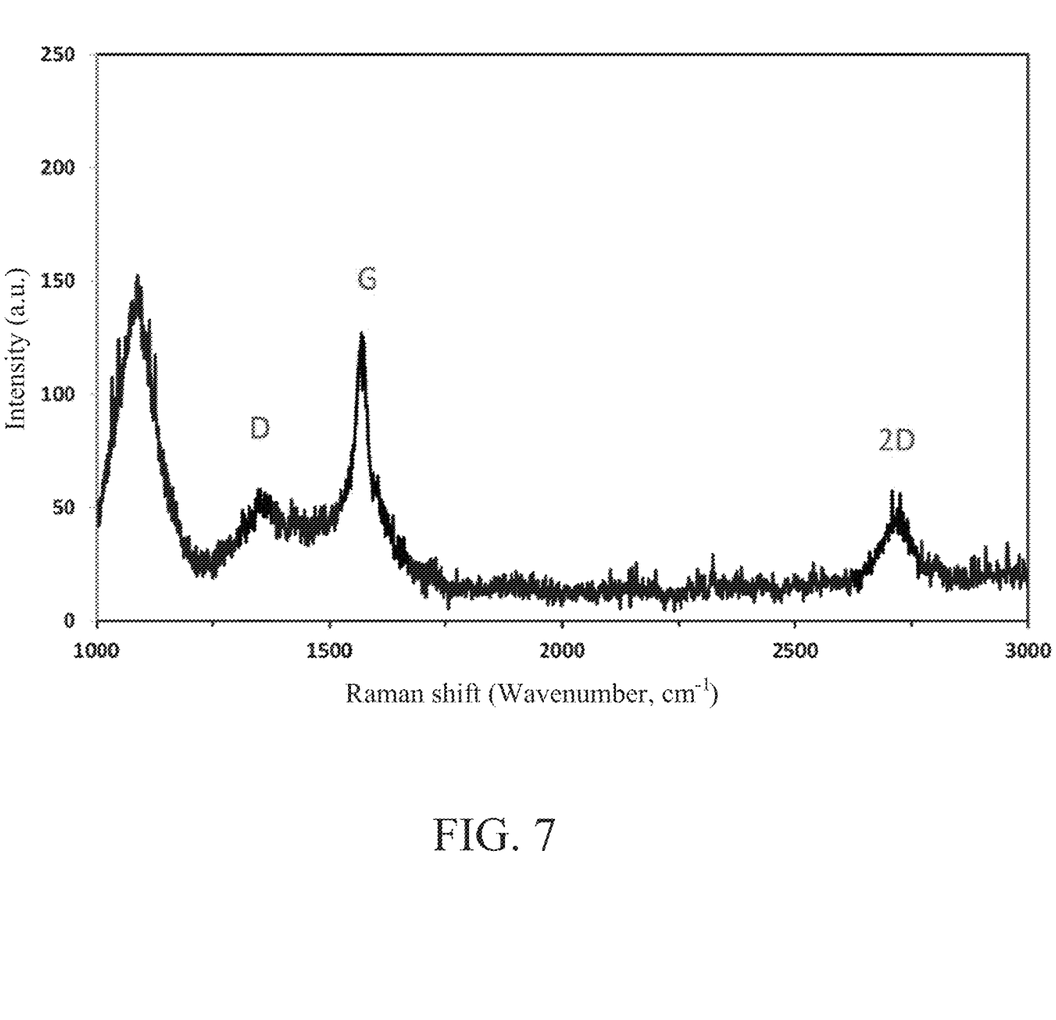
FIG. 7 is a Raman spectrum of a graphene powder of an embodiment.

The present disclosure further provides a graphene powder prepared by the above method, comprising: graphene having at least one chemical bond selected from the group consisting of N—H, C—H, C—O, C—N, and C—Si, and a number of the graphene layers is 20 or less; wherein the graphene powder has a 2D/G value of 0.3 to 0.6, and the graphene powder has a G/D value of 2.0 to 4.0, and the 2D/G value and the G/D value is obtained by a Raman spectroscopy. FIG. 7 shows a Raman spectrum of a graphene powder of an embodiment. The Raman spectrometer uses a laser wavelength of 400 to 550 nm, and has a Raman shift 1351 wavenumber as the D band, a Raman shift 1587 wavenumber as the G band, and a Raman shift 2687 wavenumber as the 2D band. The 2D/G value and the G/D value are obtained from ratios of the intensity of each band. The 2D/G value indicates a number of layers of the graphene of the graphene powder, and the low 2D/G value means that the number of layers of the graphene is more. The 2D/G value of the graphene powder of the present disclosure indicates that the graphene powder has layers of less than 15; further, the G/D value represents the proportion of defects inside the graphene, and the high G/D value indicates the lower defect ratio of the graphene.

The graphene powder prepared by the method for repairing defects of graphene according to the present disclosure has a resistance of 1.0 to $10.0 \times 10^{-6}$ ohm-cm and a thermal conductivity of 1,500 to 4,000 W/m·K, and can greatly improve the conductivity and thermal conductivity of the graphene powder.

In an embodiment, the graphene content of the graphene powder repaired by the above method can be increased from less than 80.0% to 80.0% to 99.95%.

The graphene powder provided by the above method can be applied to the field of coatings and films, and the repaired graphene powder has elements of carbon, hydrogen, nitrogen, silicon or oxygen which contribute to the dispersion of graphene in polar or non-polar solvents. The stability of the coating and the film formulation can be improved. The solvent compatible with the repaired graphene powder includes: water, formamide, trifluoroacetic acid, dimethyl sulfoxide, acetonitrile, dimethylformamide, hexamethylphosphoramide, methanol, ethanol, acetic acid, isopropanol, pyridine, tetramethylethylenediamine, acetone, triethylamine, n-butanol, dioxane, tetrahydrofuran, methyl formate, tributylamine, butanone, ethyl acetate, trioctylamine, dimethyl carbonate, diethyl ether, diisopropyl ether, n-butyl ether, trichloroethylene, diphenyl ether, dichloromethane, chloroform, dichloroethane, toluene, benzene, carbon tetrachloride, carbon disulfide, cyclohexane, hexane or kerosene. The coating and the film have the functions of dissipating heat, shielding electromagnetic waves and conducting electricity, and can be used for the uniform temperature film of the mobile phone, the functional clothing, the energy storage device, the motor module, the coating of the automobile industry or the military equipment.

Based on the method for repairing defects of graphene of the present disclosure, the ratio of defects of graphene can be effectively reduced, the composition content of graphene can be effectively increased, and the number of layers of graphene can be effectively reduced. Also, the graphene powder with good thermal conductivity and electrical conductivity can be provided. Therefore, the present disclosure has the advantages of simple process and low process cost without any pollution problem, and has wide application prospects.

The present disclosure will be further described in detail by way of examples.

EXAMPLE 1

A mixing fluid containing water as a reactive compound and supercritical carbon dioxide as a solvent was disposed in the mixing tank, and a volume ratio of water to carbon dioxide was 1:1. The carbon dioxide was injected into the mixing tank by a high pressure injection pump, and the temperature reaches 31° C. and the pressure reaches 80 standard atmospheric pressure inside the mixing tank by a heater, so that the carbon dioxide fluid was in a supercritical state, and then the water was injected into the mixing tank to mix for 5 to 10 minutes to fully dissolve the water and the supercritical carbon dioxide to form a composite fluid.

The graphene powder to be treated was placed in a container in the reactor, wherein the graphene powder has a graphene layer number of about 15 to 20. After the temperature reaches 31° C., and the pressure reaches 80 standard atmospheric pressure and conforming to the supercritical fluid environment in the reactor, introducing the composite fluid sufficiently dissolved in the mixing tank, and the volume ratio of the graphene powder to the composite fluid in the reactor was 100. High pressure impregnating the graphene powder in the reactor for about 30 minutes to passivate and repair of the defects of the graphene. Finally, completely separating the composite fluid and the repaired graphene powder by the pump and the molecular sieves simultaneously adsorbs the graphene powder retained in the composite fluid. After the separation, returning the reactor to normal temperature and pressure, retrieving the repaired graphene powder. Then, the 2D/G value and the G/D value of the graphene powder were analyzed by a Raman spectrometer. The analysis results were as shown in FIG. 7 and Table 1.

The test methods for Raman spectrometer analysis were detailed below:

1. Raman Spectrometer

| Manufacturer and model | HORIBA HR800 |
|---|---|
| Laser source | 633 nm |
| Objective lens | IR lens (50 times) working range (600 to 1300 nm) |
| Detector | CCD working range (200 to 1050 nm) resolution (1024*512 pixels) |
| Grating | 1800 working range (300 to 700 nm) |
| Filter | Laser POWER attenuation (D0.3, D0.6, D1, D2, D03, D4) |

2. Analytical Method Using Raman Spectrometer

The Raman spectrometer uses a laser wavelength of 532 nm, and has a Raman shift of 1351 wavenumber as a D band, a Raman shift of 1587 wavenumber as a G band, and a Raman shift of 2687 wavenumber as a 2D band. The 2D/G value and the G/D value were ratios obtained by the intensity of each frequency band, wherein the 2D/G value represents the number of graphene layers of the graphene powder, and the low 2D/G value means that the graphene layer number was more; the G/D value indicates the defect ratio of graphene, and the higher G/D value means the lower the defect ratio of graphene.

EXAMPLE 2

Except that the graphene powder to be treated in Example 1 was replaced with graphene powder containing about 6 to 10 layers of graphene, the remaining graphene defect improving method and test method were the same as those in Example 1.

COMPARATIVE EXAMPLE 1

Figure 8:
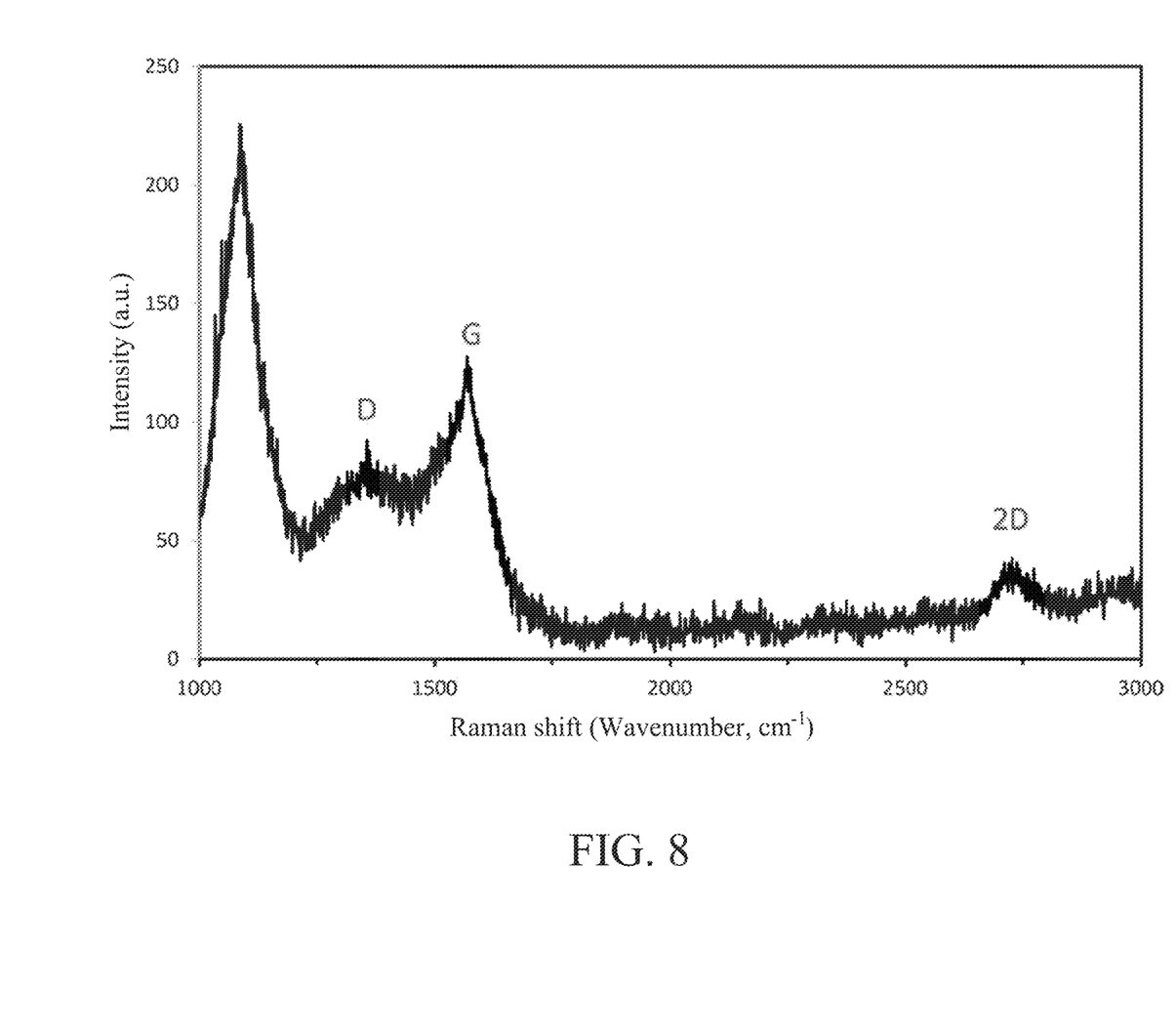
FIG. 8 is a Raman spectrum of unrepaired graphene powder.

The graphene powder prepared by physical delamination and unrepaired graphene powder was subjected to Raman spectrometer analysis, and the test method was the same as that in Example 1, and the analysis results were as shown in FIG. 8 and Table 1.

COMPARATIVE EXAMPLE 2

Figure 9:
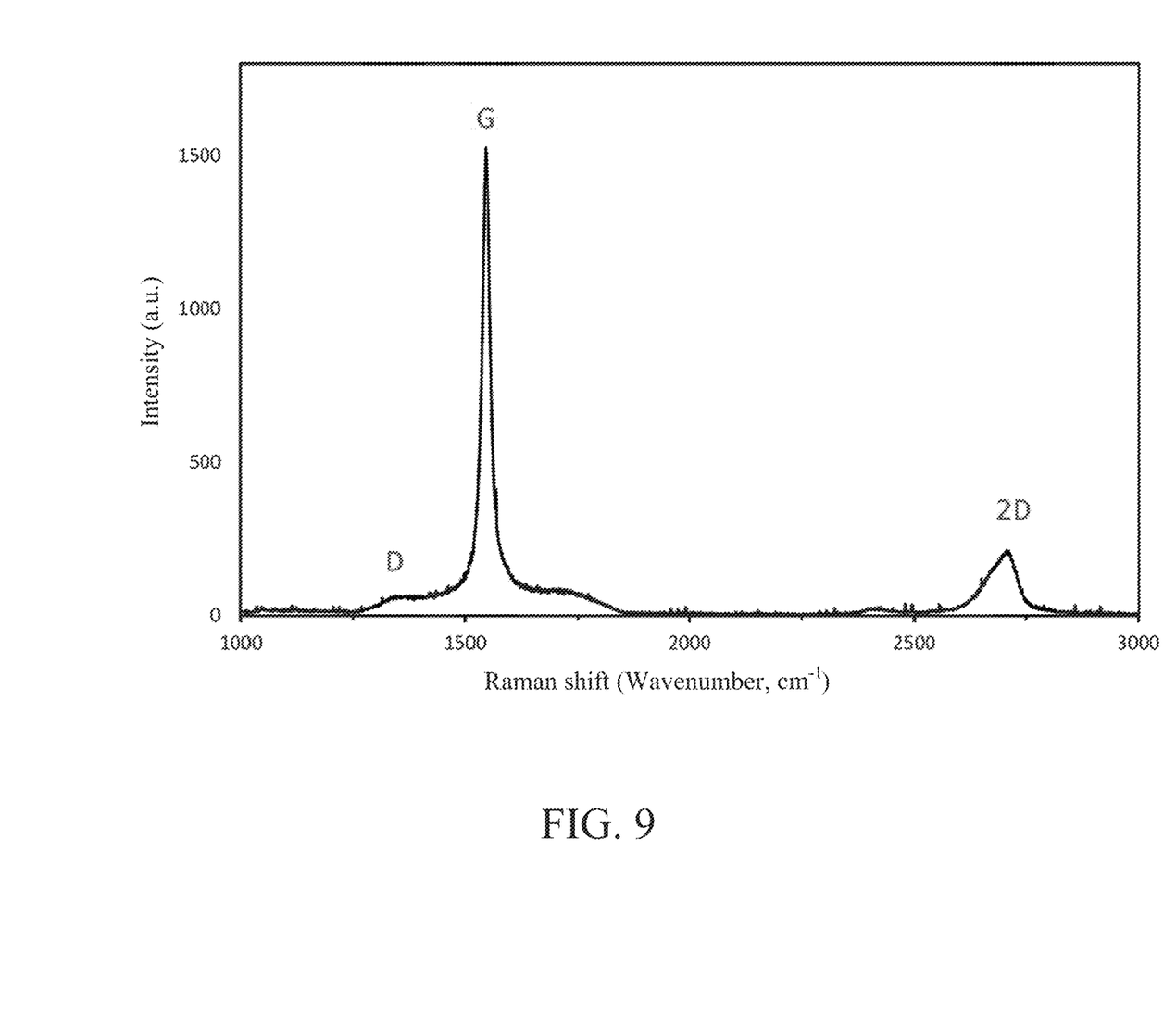
FIG. 9 is a Raman spectrum of graphene powder repaired by wet chemical reaction.

A graphene powder was repaired by a wet chemical reaction method, wherein the graphene powder to be treated contains about 10 to 15 layers of graphene; and then the graphene powder repaired by the wet chemically was subjected to Raman spectrometry analysis. The test method was the same as that in Example 1, and the analysis results were shown in FIG. 9 and Table 1.

TABLE 1

| | Example 1 | Example 2 | Comparative Example 1 | Comparative Example 2 |
|---|---|---|---|---|
| Number of layers of graphene to be treated | 15-20 | 6-10 | N/A | 10-15 |
| 2D/G value | 0.44 | 0.37 | 0.31 | 0.13 |
| G/D value | 2.21 | 3.03 | 1.34 | 25.42 |

As can be seen from the results of Table 1, compared with Comparative Example 1, the graphene powder prepared by the method for repairing graphene defects of the present disclosure significantly increases the 2D/G value and the G/D value, and indeed brings about the effect of reducing the number of layers of the graphene and reducing the defect ratio of the graphene. Moreover, compared with Comparative Example 2, the graphene powder produced by the present disclosure cannot provide a graphene having a very low defect ratio such as a wet chemical reaction method. However, the graphene powder prepared by the disclosure can effectively reduce the number of graphene layers, and can also improve the electrical, chemical and physical properties of the graphene product accordingly.

In conclusion, the method for repairing defects of graphene of the present disclosure can effectively reduce the defect ratio of graphene, increase the composition content of graphene, and reduce the number of layers of graphene, and can provide graphene powder with good thermal conductivity and electrical conductivity. The present disclosure has the advantages of simple process and low process cost without any pollution problem, and has wide application prospects.

The above embodiments are merely illustrative and are not intended to limit the present disclosure. Modifications and variations of the above-described embodiments can be made by those skilled in the art without departing from the spirit and scope of the disclosure. Therefore, the scope of the disclosure is defined by the scope of the appended claims. As long as the effects and implementation purposes of the present disclosure are not affected, they should be encompassed in the technical disclosure.

What is claimed is:

1. A method for repairing defects of graphene, comprising:
   introducing and subjecting a composite fluid having a reactive compound and a supercritical fluid to impregnate a graphene powder therewith in a reactor containing the graphene powder and conforming to a supercritical fluid environment, wherein the reactive compound is a compound comprising an element of carbon, hydrogen, nitrogen, silicon or oxygen to passivate and repair the defects of the graphene powder; and
   separating the composite fluid and the graphene powder, and adsorbing the graphene powder retained in the composite fluid by a molecular sieve.

2. The method of claim 1, wherein the reactive compound is converted to an ionic state in the supercritical fluid environment to react with the defects of the graphene to form a bond, wherein the reactive compound has a molecular weight of no more than 200 g/mole.

3. The method of claim 2, wherein the reactive compound comprises at least one selected from the group consisting of an organic silicon compound, an alkane, an alkene, an alkyne, an ammonia molecule and a derivative thereof, a hydroxide, and an organic base.

4. The method of claim 1, wherein the supercritical fluid comprises carbon dioxide, nitrogen, ethylene, propane, propylene or water.

5. The method of claim 1, wherein the supercritical fluid is carbon dioxide, and the reactive compound comprises at least one selected from the group consisting of a silane compound, ethylene, methane, acetylene, ammonia, and water, and wherein the silane compound comprises silicane, methylsilane or dimthylsilane.

6. The method of claim 1, wherein a volume ratio of the reactive compound to the supercritical fluid is from 1:1 to 1:10, and a volume ratio of the graphene powder to the composite fluid in the reactor is from 0.01 to 1000.

7. The method of claim 1, wherein the reactor has a pressure of 50 to 100 standard atmospheric pressure, a temperature of 25° C. to 400° C., and a time of impregnating from 2 to 60 minutes.

8. The method of claim 1, further comprising preparing a graphite material into the graphene powder prior to or simultaneously with the introduction of the composite fluid.

9. The method of claim 8, wherein prior to the introduction of the composite fluid, the graphite material is formed into the graphene powder in a preparation tank independent of the reactor, and the graphene powder is transferred into the reactor.

10. The method of claim 8, wherein when the composite fluid is introduced, the graphite material is formed into the graphene powder in the reactor simultaneously, and wherein the reactor is further provided with a grinding device for preparing the graphene powder by physical delamination.

11. The method of claim 10, further comprising standing the graphene powder and the composite fluid still for at least 30 minutes to settle the graphene powder after impregnating the graphene powder.

12. The method of claim 1, wherein the molecular sieve is provided in a layer within the reactor, and the molecular sieve has a pore size less than 50 μm.

13. The method of claim 1, wherein separating the composite fluid and the graphene powder comprises feeding the composite fluid into a separation tank independent of the reactor, and wherein the separation tank is further provided with a molecular sieve.

14. The method of claim 13, further comprising connecting the reactor to the separation tank with a pipeline having a diameter of less than 1 mm, and controlling a flow rate of the composite fluid in the pipeline to be at least 400 m/sec.

15. The method of claim 1, further comprising filtering the composite fluid, and refluxing the composite fluid into the reactor after separating the composite fluid and the graphene powder, wherein the composite fluid has a reflux ratio from 5% to 20%.

16. A graphene powder comprising:
   a graphene having at least one chemical bond selected from the group consisting of N—H, C—H, C—O, C—N, and C—Si, and the graphene has 20 layers or less in number;
   wherein the graphene powder has a 2D/G value of 0.3 to 0.6, and the graphene powder has a G/D value of 2.0 to 4.0, and the 2D/G value and the G/D value are obtained from an intensity ratio of a Raman shift 1351 wavenumber (D band), a Raman shift 1587 wavenumber (G band), and a Raman shift 2687 wavenumber (2D band) analyzed by a Raman spectroscopy.

17. The graphene powder of claim 16, having a graphene content from 80.0% to 99.95%.

18. The graphene powder of claim 16, having a thermal conductivity of 1500 W/m·K to 4000 W/m·K and a resistivity of 1.0 ohm-cm to $10.0 \times 10^{-6}$ ohm-cm.

* * * * *